United States Patent
Arthur et al.

(10) Patent No.: US 6,495,646 B1
(45) Date of Patent: *Dec. 17, 2002

(54) POLYOLEFINS WITH NEW STRUCTURES

(75) Inventors: Samuel David Arthur, Wilmington, DE (US); Maurice S. Brookhart, III, Chapel Hill, NC (US); Patricia Metzger Cotts, Greenville, DE (US); Zhibin Guan, Hockessin, DE (US); Lynda Kaye Johnson, Wilmington, DE (US); Christopher Moore Killian, Gray, TN (US); Elizabeth Forrester McCord, Hockessin, DE (US); Stephan James McLain, Wilmington, DE (US)

(73) Assignees: E. I. du Pont de Nemours and Company, Wilmington, DE (US); University of North Carolina at Chapel Hill, Chapel Hill, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/514,880

(22) Filed: Feb. 29, 2000

Related U.S. Application Data

(63) Continuation of application No. 09/042,776, filed on Mar. 17, 1998, now abandoned, which is a continuation-in-part of application No. 08/899,002, filed on Jul. 10, 1997, which is a division of application No. 08/590,650, filed on Jan. 24, 1996, now Pat. No. 5,880,241, which is a continuation-in-part of application No. 08/473,590, filed on Jun. 7, 1995, now abandoned, which is a continuation-in-part of application No. 08/415,283, filed on Apr. 3, 1995, now abandoned, which is a continuation-in-part of application No. 08/378,044, filed on Jan. 24, 1995, now abandoned

(60) Provisional application No. 60/002,654, filed on Aug. 22, 1995, and provisional application No. 60/007,375, filed on Nov. 15, 1995.

(51) Int. Cl.$^7$ ............................ C08F 20/02; C08F 10/02
(52) U.S. Cl. .................... 526/317.1; 526/319; 526/352
(58) Field of Search ................................ 526/172, 352, 526/348.6, 317.1, 319

(56) References Cited

U.S. PATENT DOCUMENTS 5,942,461 A * 8/1999 Brown et al. ................ 502/154

FOREIGN PATENT DOCUMENTS

WO     WO96/23010     8/1996     ......... C08F/210/16

* cited by examiner

Primary Examiner—David W. Wu
Assistant Examiner—R. Harlan

(57) ABSTRACT

Polyolefins with unique highly branched structures, and which have unusually low Mark-Houwink constants are described. They are useful for instance as elastomers, viscosity index modifiers and lubricating oil bases.

9 Claims, No Drawings

POLYOLEFINS WITH NEW STRUCTURES

CROSS REFERENCE TO RELATED APPLICATION

This application is a continuation of application Ser. No. 09/042,776, filed Mar. 17, 1998 now abandoned.

This application is also a continuation-in-part of application Ser. No. 08/899,002, filed Jul. 10, 1997, which is a division of application Ser. No. 08/590,650, filed Jan. 24, 1996, now U.S. Pat. No. 5,880,241, which is a continuation-in-part of application Ser. No. 08/473,590, filed Jun. 7, 1995, now abandoned, which is a continuation-in-part of application Ser. No. 08/415,283, filed Apr. 3, 1995, now abandoned, which is a continuation-in-part of application Ser. No. 08/378,044, filed Jan. 24, 1995, now abandoned, and which further dervies priority under 35 U.S.C. §119(e) from provisional application Serial Nos. 60/002,654, filed Aug. 22, 1995, and 60/007,375, filed Nov. 15, 1995.

FIELD OF THE INVENTION

Polyolefins having unique structures can be made by polymerization with certain late transition metal catalysts. The novel polyolefins have large amounts of branching of all lengths, as a result of which many properties such as molecular size in solution and viscosity are different than for "formal" polyolefins.

TECHNICAL BACKGROUND

Addition polymerization of olefins can be accomplished by many methods depending on the olefin(s) to be polymerized. Methods such as coordination polymerization and radical polymerization have been employed. For the most part, these yield polymers which are often linear or contain a small amount of short and sometimes long chain branching. It is well known in the art that the presence of branching alters the properties of the polymer produced, for example low density polyethylene, which is made by high pressure free radical polymerization and contains some short and long chain branching, has a lower melting point and density and different processing characteristics than high density polyethylene which is linear and made by coordination polymerization. Both are important commercial products.

It has recently been reported (see for instance World Patent Application 96/23010, equivalent to U.S. patent application Ser. No. 590,650, filed Jan. 24,1996, both of which are hereby included by reference) that certain late transition metal catalysts can produce polyolefins which have short chain branching, sometimes extensive, which is not due simply to branches caused by the alkyl groups on, for instance, α-olefins. Indeed it is reported that these polyolefins often have more or less short branches than one would expect from the typical polymerization with Ziegler-Natta or metallocene type catalysts. While it is stated that this short chain branching leads to many changes in properties for these polyolefins, such as different melting points and densities, there is no mention that it also leads to large changes in the overall polymer structure (polymer topology) which can affect other polymer properties.

It is known in the art that differing branching in polymers leads to property changes, see for instance F. W. Billmeyer, Textbook of Polymer Science, 3$^{rd}$ Ed., John Wiley and Sons, New York, 1984, chap. 8 and 11; P. J. Flory, Principles of Polymer Chemistry, Cornell University Press, 1953, chap. 7; and C. Tanford, Physical Chemistry of Macromolecules, John Wiley & Sons, New York, 1961, chap. 6 and 9, all of which are hereby included by reference. For instance, it is well known that long chain branching can affect bulk polyolefin viscosities to the point that some long chain branching is sometimes deliberately introduced into otherwise linear (except perhaps for short chain branching) polyolefins to alter their bulk melt behavior. This is usually done by the introduction of small amounts (larger amounts normally lead to crosslinking) of a difunctional monomer which acts as a branch point in the polyolefin molecule.

Therefore the ability to provide polyolefins with large amounts of branching, especially long chain branching is desired. However one normally wishes to accomplish this without unduly increasing the molecular weight of the polyolefin (as occurs before crosslinking) or actually crosslinking the polyolefin.

SUMMARY OF THE INVENTION

This invention concerns a polyolefin, wherein a root mean square radius of a molecule of said polyolefin in tetrahydrofuran solution is:

less than 40 nm at a molecular weight of 1,000,000 Dalton; or less than 15 nm at a molecular weight of 100,000 Dalton; and provided that:

said polyolefin is composed of repeat units derived from one or more olefins of the formula $H_2C{=}CHR^1$, wherein $R^1$ is hydrogen, hydrocarbyl, substituted hydrocarbyl or a functional group.

This invention concerns a polyolefin, wherein an intrinsic viscosity of said polyolefin in tetrahydrofuran solution is:

less than 3.0 dL/g nm at a molecular weight of 1,000,000 Dalton; or less than 0.80 dL/g at a molecular weight of 100,000 Dalton; or less than 0.25 dL/g at a molecular weight of 10,000 Dalton;

and provided that:

said polyolefin is composed of repeat units derived from one or more olefins of the formula $H_2C{=}CHR^1$, wherein $R^1$ is hydrogen, hydrocarbyl, substituted hydrocarbyl or a functional group.

This invention also concerns a polyolefin, wherein a root mean square radius of a molecule of said polyolefin in tetrahydrofuran solution is described by the equation:

$$R_g = A(M^B)$$

wherein:

$R_g$ is said root mean square radius in nm;

A is a constant;

M is a molecular weight of said molecule; and

B is a constant whose value is about 0.50 or more;

and provided that:

said polyolefin is composed of repeat units derived from one or more olefins of the formula $H_2C{=}CHR^1$, wherein $R^1$ is hydrogen, hydrocarbyl, substituted hydrocarbyl or a functional group.

Also described herein is a polyolefin, wherein Mark-Houwink constants are measured by size exclusion chromatography/viscometry in tetrahydrofuran and calculated according to the equation $$[\eta] = KM^\alpha$$

wherein:

[η] is an intrinsic viscosity in tetrahydrofuran of said polyolefin of molecular weight M;

M is a molecular weight of said polyolefin;

α is about 0.60 or less;

and provided that:

said polyolefin is composed of repeat units derived from one or more olefins of the formula $H_2C=CHR^1$, wherein $R^1$ is hydrogen, hydrocarbyl, substituted hydrocarbyl or a functional group.

BRIEF DESCRIPTION OF THE FIGURES

FIG. 1 depicts the data from which the constants in Table 1 were calculated. It is a log-log plot of $R_g$ vs. molecular weight of the polymer.

FIG. 2 depicts the data from which the constants in Table 2 were calculated. It is a log-log plot of [η] vs. molecular weight of the polymer.

DETAILED DESCRIPTION OF THE PREFERRED EMBODIMENTS

Herein certain terms are used to define certain chemical groups or compounds. These terms are defined below.

A "hydrocarbyl group" is a univalent group containing only carbon and hydrogen. If not otherwise stated, it is preferred that hydrocarbyl groups herein contain 1 to about 30 carbon atoms.

By "substituted hydrocarbyl" herein is meant a hydrocarbyl group which contains one or more substituent groups which are inert under the process conditions to which the compound containing these groups is subjected. The substituent groups also do not substantially interfere with the process. If not otherwise stated, it is preferred that substituted hydrocarbyl groups herein contain 1 to about 30 carbon atoms. Included in the meaning of "substituted" are heteroaromatic rings.

By "saturated hydrocarbyl" is meant a univalent group containing only carbon and hydrogen which contains no unsaturation, such as olefinic, acetylenic, or aromatic groups. Examples of such groups include alkyl and cycloalkyl. If not otherwise stated, it is preferred that saturated hydrocarbyl groups herein contain 1 to about 30 carbon atoms.

By "α-olefin" is meant a compound of the formula $CH_2=CHR^{19}$, wherein $R^{19}$ is n-alkyl or branched alkyl, preferably n-alkyl.

By "linear α-olefin" is meant a compound of the formula $CH_2=CHR^2$, wherein $R^2$ is n-alkyl. It is preferred that the linear α-olefin have 4 to 40 carbon atoms.

By an olefinic group that takes part in the polymerization is meant a carbon-carbon double bond, but does not include bonds in aromatic rings, which undergoes addition polymerization during the formation of the polyolefin.

By a functional group is meant a group which is not hydrocarbyl but which does not prevent or excessively inhibit the polymerization.

In the discussion below, reference may sometimes be made to the properties of a "polymer molecule". As is well known to the artisan, such properties are almost always measured on collections of such molecules and are therefore averages of the properties of a relatively large number of these molecules.

One property that changes as the branching changes is the size of that polymer molecule in solution. This is usually measured as the root mean square radius (or diameter) (RMSR) which takes into account that the polymer molecule is usually flexible over its length and in solution assumes a random ball-like shape. Generally speaking at any particular molecular weight the more compact the polymer molecule is the smaller the RMSR is. It is well known that as the amount of branching increases, the RMSR will also decrease since the polymer molecule becomes more compact.

Usually the relationship between polymer molecular weight and RMSR can be expressed by an equation of the form $$R_g = A(M^B) \qquad \text{eq. (1)}$$

wherein $R_g$ is RMSR, A and B are constants characteristic of the particular polymer and the measurement conditions (see below for measurement details), and M is the molecular weight of the polymer. Herein $R_g$ (and RMSR) are measured in nm, while M is measured in Daltons or the numerically equivalent g/mol.

In the polyolefins described herein, and under the measurement conditions used, it is preferred that A is about 0.05 or less, more preferably about 0.04 or less, especially preferably about 0.02 or less, and most preferably less than about 0.01. It is also preferred that B is 0.50 or more, especially preferred that it is about 0.55 or more, and more preferred that it is about 0.60 or more. It is also preferred that any of the preferred values for A be combined with any of the preferred values for B, and vice versa.

The polymers described herein also have unusual Mark-Houwink constants, when measured by intrinsic viscosity in THF. Mark-Houwink constants are well known in the art and are based on eq. (2), $$[\eta] = KM^\alpha \qquad \text{eq. (2)}$$

wherein the symbols are as described above, and the measurements are made as described below. This equation, as it normally does, applies to the log-log plot obtained of intrinsic viscosity as the molecular weight is varied. The data is fitted to a straight line in the range in which the data is reliable (as is usually done). Preferably α is about 0.58 or less, more preferably about 0.55 or less, and especially preferably about 0.50 or less. These are exceptionally low Mark-Houwink constants.

At a polyolefin molecular weight of 1,000,000 Daltons, it is preferred that the $R_g$ is less than 30 nm, more preferably less than 20 nm. At a polyolefin molecular weight of 100,000 Daltons, it is preferred that Rg is less than 10 nm, more preferably less than 8 nm.

At a polyolefin molecular weight of 1,000,000 Daltons, it is preferred that the intrinsic viscosity is less than 2 dL/g, more preferably less than 1 dL/g. At a polyolefin molecular weight of 100,000 Daltons, it is preferred that the intrinsic viscosity is less than 0.8 dL/g, more preferably less than 0.3 dL/g. At a polyolefin molecular weight of 10,000 Daltons, it is preferred that the intrinsic viscosity is less than 0.2 dL/g, more preferably less than 0.1 dL/g.

The polymers described herein are made from monomers of the formula $H_2C=CHR^1$, wherein $R^1$ is defined as above. In preferred monomers, $R^1$ is hydrogen, alkyl, substituted alkyl, or a functional group. Preferred alkyl groups are n-alkyl groups, and methyl is especially preferred. It is also especially preferred that $R^1$ is hydrogen. Preferred substituted alkyl groups are $-(CH_2)_zCO_2R^3$ wherein z is 1 to 20 and $R^3$ is hydrogen, hydrocarbyl or substituted hydrocarbyl, preferably alkyl. A preferred functional group is $-CO_2R^6$, wherein $R^6$ is hydrogen, hydrocarbyl or substituted hydrocarbyl. It is preferred that $R^6$ is hydrocarbyl or substituted hydrocarbyl, especially alkyl. In all cases it is also preferred that $R^1$ does not contain an olefinic group that also takes part in a polymerization that forms said polyolefin.

The polyolefins described herein are useful as elastomers, oil viscosity modifiers, lubricating oil bases, and many other uses, see for instance World Patent Application 96/23010.

Preparation of the polymerization catalyst, which catalysts polymerize which monomers, and general descriptions of how to run polymerizations will be found in World Patent Application 96/23010, equivalent to U.S. patent application Ser. No. 590,650, filed Jan. 24, 1996, U.S. Pat. No. 5,714,556, and World Patent Applications 97/48737, 97/48735, 97/38024.

In the Examples, all pressures are absolute pressures. Methods of NMR analyses and the results obtained are described in World Patent Application 96/23010. In the Examples the following abbreviations are used:

GPC—gel permeation chromatography (same as size exclusion chromatography)

Mn—number average molecular weight

Mw—weight average molecular weight

THF—tetrahydrofuran

SEC/MALS Analysis of Branched Polyolefins

The polymers analyzed are all branched polyolefins that are soluble in THF at ambient temperatures. Determination of molecular weights and the root-mean-square radius of gyration ($R_g$) was accomplished using size exclusion chromatography coupled with a multi-angle light scattering detector (SEC/MALS). Results were fitted to straight lines using eq. (1) and are given for the various polymers in Table 1. For all purposes herein, measurements for eq. (1) are done as follows:

Light scattering intensity at 18 scattering angles was recorded as the polymer solution eluted from the column. The concentration was monitored using a differential refractometer. The M and $R_g$ were evaluated at selected points of the distribution using the well-established expressions for classical light scattering:

$$Kc/R_\Theta = 1/M \{1 + 16\pi^2 n^2 R_g^2 \sin^2(\theta/2)/3\lambda^2\}$$

$R_\Theta$ is the Rayleigh ratio at scattering angle $\Theta$, obtained from the scattered intensity.

K is equal to $4\pi^2 n^2 (dn/dc)^2/\lambda^4 N_A$, with n the refractive index of the solvent, 1.404 for THF, $\lambda$ the wavelength of light, 632.8 nm, $N_A$ Avogadro's number, and dn/dc the refractive index increment, 0.078 for polyethylenes in THF. The concentration c was determined either by weight or by the calibration of the differential refractometer using the dn/dc given above. The concentrations eluting from the column were sufficiently small that the concentration dependence could be neglected.

Experimental Details of SEC/MALS

A Waters Alliance 2690 chromatography system (Waters Corp., 34 Maple St., Milford, Mass. 01757 U.S.A.) in stabilized THF, 0.5 mL/min flow, a Waters R410 differential refractometer (Waters Corp.), at sensitivity=16, and a Wyatt Technology Dawn DSP Multi-angle light scattering detector (Wyatt Technology Corp., 30 S. La Patera Ln., B-7, Santa Barbara, Calif. 93117 U.S.A.), using 632.8 nm light were used. Wyatt Technology ASTRA® for Windows® software (Wyatt Technology Corp.) was used to collect and analyze data. Polymer Laboratories Mixed D, 5 micron Mixed PLGel columns; 2×30 cm, (Polymer Laboratories, Inc., 160 Old Farm Rd., Amherst, Mass. 01002 U.S.A.) were used.

Polymer (0.5–1.0 mg) was in ected in 100–200 $\mu$L of solution, the column temperature was 40° C., and the R410 temperature was 40° C. Poly(1-decene) polymer was very high in molecular weight and was analyzed with 4 Polymer Laboratories MiniMix® Mixed A 20 $\mu$m columns (Polymer Laboratories Inc.) at 0.3 mL/min flow rate.

$R_g$ as a function of M was obtained for each polymer over the range of molecular weight encompassed by the polymer sample. The data for each polymer was fitted by the expected relation:

$R_g = A^* M^B$, with $R_g$ in nm

Size Exclusion Chromatography/Viscometry

All measurements and calculations relating to eq. 2, and for measurement of intrinsic viscosity were done as follows:

Measurements were made using a Waters "150-CV plus" chromatograph (Waters Corp.) with four Shodex® KF-806M columns (made by Showa Denko K. K., available from Showa Denko America, Inc., 280 Park Ave., New York, N.Y. 10017 U.S.A.) operating at 35° C. in THF at a flow rate of 1 mL/min. Injection volume was 150 microliters at a concentration of 1.5 mg/mL. Narrow fraction polystyrene standards from Polymer Laboratories Inc. were used: to develop the universal calibration. A Waters Millennium® 2020 data system with GPCV software (Waters Corp.), version 2.15.1, was used to acquire and process the data. Intrinsic viscosities were measured at 35° C.

Data Treatment and Resulting Mark-Houwink Constants

The Mark-Houwink constants of the intrinsic viscosity-molecular weight relationship were obtained from a fit of the lower molecular-weight portion of the good data region; however, because the relationship was found to be nearly linear throughout the entire distribution of all subject polymers, the reported constants described the relationship of the higher molecular-weight species as well. Measured Mark-Houwink constant are given in Table 2.

EXAMPLE 1

A solution of 50 mg (33.9 $\mu$mol) of [(ArN=C(Me)—C(Me)=NAr)Pd(CH$_2$)$_3$C(O)OMe](BARF) {Ar=2,6-Me$_2$C$_6$H$_3$; BARF=[B{3,5-C$_6$H$_3$(CF$_3$)$_2$}$_4$]$^-$} in 100 mL of chlorobenzene was transferred into a 600 mL Parr® pressure reactor under nitrogen. The reactor was heated to 35° C. and the solution was stirred by a mechanical stirrer set at 500 r.p.m. Ethylene was charged to the reactor to 3.6 MPa. Polymerization was continued at 35° C. and 3.6 MPa for 4.7 h. After terminating the polymerization, the solution was diluted with toluene; then passed through a column packed with alumina, silica gel and Celite® to remove the catalyst; and finally was precipitated into a large excess of methanol. The rubbery polymer was collected and dried in vacuo to give 27.0 polyethylene as rubbery solid. GPC (in THF, using light scattering detector) results are : Mn=2.74×10$^5$, Mw=3.83×10$^5$, $R_w$=30.3 nm ($R_w$ is the weight averaged root-mean-square radius of gyration of the polymer). Quantitative $^{13}$C NMR (in trichlorobenzene, at 120° C.) showed it has 113 total branches per 1000 methylenes. The distribution of branching was as follows (branches/1000 methylenes): methyl (42.5), ethyl (23.1), propyl (4.4), butyl (9.3), amyl (4.6), hexyl and longer (31.9).

EXAMPLE 2

The polymerization conditions and procedures were the same as described in Example 1 except that the ethylene pressure was 1.8 MPa. Polyethylene (22.0 g) was obtained after polymerizing for 4 h. GPC (in THF, using light scattering detector) results are : Mn=2.21×10$^5$, Mw=3.56× 10$^5$, R$_w$=25.2 nm. Quantitative $^{13}$C NMR (in trichlorobenzene, at 120° C.) showed it has 117 total branches per 1000 methylenes. The distribution of branching was as follows (branches/1000 methylenes): methyl (42.3), ethyl (25.8), propyl (3.6), butyl (11.4), amyl (3.8), hexyl and longer (31.9).

EXAMPLE 3

The polymerization conditions and procedures were the same as described in Example 1 except that the ethylene pressure was 790 kPa. Polyethylene (20.0 g) was obtained after polymerizing for 5.3 h. GPC (in THF, using light scattering detector) results are : Mn=2.74×10$^5$, Mw=3.83× 10$^5$, R$_w$=30.3 nm. Quantitative $^{13}$C NMR (in trichlorobenzene, at 120° C.) showed it has 117.8 total branches per 1000 methylenes. The distribution of branching was as follows (branches/1000 methylenes): methyl (40.2), ethyl (26.8), propyl (3.0), butyl (11.9), amyl (3.2), hexyl and longer (34.2).

EXAMPLE 4

The polymerization conditions and procedure were the same as described in Example 1 except that the ethylene pressure was 450 kPa. Viscous oily polyethylene (20.0 g) was obtained after polymerizing for 5.1 h. GPC (in THF, using light scattering detector) results are: Mn=1.64×10$^5$, Mw=2.66×10$^5$, R$_w$=18.1 nm. Quantitative $^{13}$C NMR (in trichlorobenzene, at 120° C.) showed it has 122 total branches per 1000 methylenes. The distribution of branching was as follows (branches/1000 methylenes): methyl (40.9), ethyl (28.7), propyl (2.9), butyl (11.9), amyl (3.2), hexyl and longer (34.8).

EXAMPLE 5

The polymerization conditions and procedure were the same as described in Example 1 except,that the ethylene was bubbled through the solution constantly at 103 kPa (atmospheric pressure). Oily polyethylene (15.8 g) was obtained after polymerizing for 18.7 h. GPC (in THF, using light scattering detector) results are: Mn 2.55×10$^5$, Mw=4.02×10$^5$, R$_w$=19.3 nm. Quantitative $^{13}$C NMR (in trichlorobenzene, at 120° C.) showed it has 123 total branches per 1000 methylenes. The distribution of branching was as follows (branches/1000 methylenes): methyl (39.3), ethyl (29.6), propyl (3.1), butyl (12.1), amyl (2.3), hexyl and longer (36.3).

Example 6

The polymerization conditions and procedure were the same as described in Example 1 except that a mixed gas of ethylene and nitrogen (1:9) was bubbled through the catalyst solution constantly at atmospheric pressure (the ethylene partial pressure was 10 kPa). After polymerizing for two days, it was stopped and the solution was diluted with toluene; then passed through a column packed with alumina, silica gel and Celite® to remove the catalyst; and finally all the solvent was removed under vacuum to give 2.7 g of oily polyethylene. GPC (in THF, using light scattering detector) results are: Mn=9.29×10$^4$, Mw=1.51×10$^5$, R$_w$=10.1 nm. Quantitative $^{13}$C NMR (in trichlorobenzene, at 120° C.) showed it has 122 total branches per 1000 methylenes. The distribution of branching was as follows (branches/1000 methylenes): methyl (38.9), ethyl (28.8), propyl (3.0), butyl (12.1), amyl (3.6), hexyl and longer (36.3).

TABLE 1

| Polymer of Ex. No. | A | B |
|---|---|---|
| 1 | 0.041 | 0.51 |
| 4 | 0.014 | 0.58 |
| 5 | 0.012 | 0.58 |
| 6 | 0.004 | 0.61 |
| Nordel ® N2522[a] | 0.118 | 0.42 |
| Poly(1-decene) | 0.089 | 0.46 |

[a]An ethylene-propylene-1,4-hexadiene rubber containing a small amount of a second diene that acts as a branching point. Available from DuPont-Dow Elastomers, Wilmington, DE, U.S.A.

TABLE 2

| Polymer of Ex. No. | K | α |
|---|---|---|
| 1 | 0.00132 | 0.557 |
| 5 | 0.00024 | 0.606 |
| 6 | 0.00324 | 0.327 |

What is claimed is:

1. A polyolefin, wherein a root mean square radius of a molecule of said polyolefin in tetrahydrofuran solution is:
   less than 20 nm at a molecular weight of 1,000,000 Dalton; or
   less than 8 nm at a molecular weight of 100,000 Dalton; and provided that:
   said polyolefin is composed of repeat units derived from one or more olefins of the formula H$_2$C=CHR$^1$, wherein R$^1$ is hydrogen, hydrocarbyl, substituted hydrocarbyl or a functional group.

2. A polyolefin, wherein an intrinsic viscosity of said polyolefin in tetrahydrofuran solution is:
   less than 1.0 dL/g nm at a molecular weight of 1,000,000 Dalton; or
   less than 0.30 dL/g at a molecular weight of 100,000 Dalton;
   and provided that:
   said polyolefin is composed of repeat units derived from one or more olefins of the formula H$_2$C=CHR$^1$, wherein R$^1$ is hydrogen, hydrocarbyl, substituted hydrocarbyl or a functional group.

3. A polyolefin, wherein a root mean square radius of a molecule of said polyolefin in tetrahydrofuran solution is described by the equation:

$$R_g = A(M^B)$$

wherein:
   $R_g$ is said root mean square radius in nm;
   A is a constant characteristic of said polyolefin;
   M is a molecular weight of said molecule; and
   B is a constant whose value is 0.60 or more;
and provided that:
   said polyolefin is composed of repeat units derived from one or more olefins of the formula H$_2$C=CHR$^1$, wherein R$^1$ is hydrogen, hydrocarbyl, substituted hydrocarbyl or a functional group.

4. A polyolefin, wherein Mark-Houwink constants are measured by size exclusion chromatography/viscometry in tetrahydrofuran and calculated according to the equation $$[\eta] = KM^\alpha$$

wherein:

[η] is an intrinsic viscosity in tetrahydrofuran of said polyolefin of molecular weight M;

M is a molecular weight of said polyolefin;

α is about 0.50 or less;

and provided that:

said polyolefin is composed of repeat units derived from one or more olefins of the formula $H_2C=CHR^1$, wherein $R^1$ is hydrogen, hydrocarbyl, substituted hydrocarbyl or a functional group.

5. The polyolefin as recited in claim 1, 2, 3 or 4 wherein $R^1$ does not contain an olefinic group that also takes part in a polymerization to form said polyolefin.

6. The polyolefin as recited in claim 1, 2, 3 or 4 wherein $R^1$ is one or more of hydrogen and n-alkyl.

7. The polyolefin as recited in claim 1, 2, 3 or 4 wherein $R^1$ is hydrogen.

8. The polyolefin as recited in claim 3 wherein A is about 0.010 or less.

9. The polyolefin as recited in claim 1, 2, 3 or 4, wherein $R^1$ is hydrogen; $-(CH_2)_zCO_2R^3$ wherein Z is 1 to 20 and $R^3$ is hydrocarbyl or substituted hydrocarbyl; or $-CO_2R^6$ wherein $R^6$ is hydrogen, hydrocarbyl or substituted hydrocarbyl.

* * * * *